United States Patent
Endo

(10) Patent No.: US 6,953,555 B2
(45) Date of Patent: Oct. 11, 2005

(54) DIESEL PARTICULATE REMOVING APPARATUS

(75) Inventor: Kiyomu Endo, Tokyo (JP)

(73) Assignee: O-DEN Corporation, Tokyo (JP)

( * ) Notice: Subject to any disclaimer, the term of this patent is extended or adjusted under 35 U.S.C. 154(b) by 723 days.

(21) Appl. No.: 09/971,931

(22) Filed: Oct. 9, 2001

(65) Prior Publication Data

US 2002/0060992 A1 May 23, 2002

(30) Foreign Application Priority Data

Nov. 22, 2000 (JP) .......................................... 2000-355793
Nov. 30, 2000 (JP) .......................................... 2000-366412

(51) Int. Cl.⁷ .......................... B01D 53/34; F01N 3/021; F01N 3/035
(52) U.S. Cl. ....................... 422/177; 422/171; 422/180; 55/DIG. 30
(58) Field of Search ................................ 422/171, 174, 422/177, 199; 60/299, 300; 55/DIG. 10, DIG. 30; 219/552–553

(56) References Cited

U.S. PATENT DOCUMENTS

| | | | | |
|---|---|---|---|---|
| 4,152,302 A | * | 5/1979 | Nonnenmann et al. | 502/338 |
| 4,576,800 A | * | 3/1986 | Retallick | 422/180 |
| 5,203,166 A | * | 4/1993 | Miller | 60/274 |
| 5,643,484 A | | 7/1997 | Swars et al. | 422/174 |
| 5,882,607 A | * | 3/1999 | Miyadera et al. | 422/177 |
| 5,961,931 A | * | 10/1999 | Ban et al. | 422/171 |
| 6,023,930 A | | 2/2000 | Abe et al. | 60/311 |

FOREIGN PATENT DOCUMENTS

| | | |
|---|---|---|
| FR | 2 774 422 A1 | 2/1998 |
| GB | 2 134 407 A | 2/1984 |
| JP | 61-55114 | 4/1986 |
| JP | 61-84851 | 6/1986 |
| JP | 2-173310 | 7/1990 |
| JP | 6-212954 | 8/1994 |
| JP | 8-193509 | 7/1996 |
| JP | 09222009 | 8/1997 |
| JP | 09317440 | 12/1997 |

OTHER PUBLICATIONS

European Office Action dated Jan. 9, 2003.
European Search Report dated Mar. 19, 2002.

* cited by examiner

Primary Examiner—Hien Tran
(74) Attorney, Agent, or Firm—McGinn IP Law Group, PLLC

(57) ABSTRACT

A diesel particulate removing apparatus of a two-vessel three-layer catching structure has two main bodies. Respective main bodies have cylindrical vessels provided with inlet ports and outlet ports for a diesel exhaust gas. In the cylindrical vessel, rolled catalyst mounting heaters, heat-resisting filters, and catalyst mounting spherical filters are arranged in the order above at an inlet port of a diesel exhaust gas. These catalyst mounting heaters are alternatively turned ON or OFF.

21 Claims, 14 Drawing Sheets

DIESEL PARTICULATE REMOVING APPARATUS

BACKGROUND OF THE INVENTION

1. Field of the Invention

The present invention relates to a diesel particulate removing apparatus and more particularly to a diesel particulate removing apparatus capturing particulates contained in an exhaust gas from an internal combustion engine such as a diesel engine by means of heaters and filters, burning the captured particulates, and removing the particulates from the filters to reuse or refresh the filters.

The present application claims priorities of Japanese Patent Applications Nos.2000-355793 filed on Nov. 22, 2000 and 2000-366412 filed on Nov. 30, 2000 which are hereby incorporated by reference.

2. Description of the Related Art

Nowadays, the object of restriction to an automobile exhaust gas is nitrogen oxides (NOx), containing mainly carbon and nitrogen, which is said to be a cancer generating substance.

Exhaust gas from diesel vehicles contains a number of carbon particulates (so called black fume or smoke). When the carbon particulates enter into the air through an exhaust duct, they float in the air for a long time, and finally drop onto house floors and roads or attach to clothing in a form of soot. According to recent medical reports, carbon substance absorbs various materials of considerable volume, chemical substances such as cancer-generating related ones are therefore adhered to the floating carbon particulates. The carbon particulates inhaled by human beings enter into their bodies and cause cancers and diseases of the respiratory system.

As described above, it is an important subject for study to restrict not only nitrogen oxides (NOx) but particulate matter (PM) exhausted from the diesel vehicles. In order to protect the environment from pollution from the black fume, a black fume capturing apparatus provide with a black fume removing filter consisting of metal fiber and honeycomb-shape elements, which is placed in the exhaust duct of the automobile diesel engine (see Japanese Utility model laid-open Sho61-55114 and Sho61-84851 official gazettes). However, when the black fume removing filter of this kind has been used for a long time, the filter clogs easily with the particulates of collected black fume, thus increasing disadvantageously a pressure loss.

As a resolving means for such clogging with black fume, diesel engine particulates removing apparatuses are proposed and described in the official gazettes of Japanese Patent Laid-open No. Hei2-173310, No. Hei6-212954, and No. Hei8-193509.

As shown in FIG. 16, the diesel engine particulates removing apparatus as mentioned above has a cylindrical vessel 3 with an inlet 1 and an outlet 2 for an exhaust gas, a ceramic heater 4 provided at an inlet side within the cylindrical vessel 3, a porous foam filter 5 placed adjacent to the back of the ceramic heater 4, and a catalyst mounting filter 6 arranged adjacent to the back of the porous foam filter 5.

According to the conventional structure of the diesel engine particulates removing apparatus as described above, an exhaust gas introduced into the cylindrical vessel 3 through the inlet 1 contacts with the ceramic heater 4 and burns. Unburned particles are captured in the porous foam filter 5 and the catalyst mounting filter 6 to remove the captured particulates. At this time, thermal energy or heat of the ceramic heater 4 and an exhaust gas conducts to the porous foam filter 5 to burn the unburned particles collected in the porous foam filter 5. The catalyst mounting filter 6 placed downstream of the ceramic heater 4 receives less conductive heat from the ceramic heater 4 and an exhaust gas, which lowers the temperature of the catalyst mounting filter 6. Catalyst mounted in the catalyst mounting filter 6 accelerates burning of collected particulates, so that many particles captured burn at a relatively low temperature and are removed without an accidental fire, resulting in recovery of filtering function of the catalyst mounting filter 6.

However, in accordance with the conventional apparatus for removing diesel engine particulates, since the catalyst mounting filter 6 is placed downstream of the ceramic heater 4, the temperature of the catalyst mounting filter 6 tends to become high at upstream side and low at downstream side. As a result, some particulates (fine particulates) may be left unburned, and the catalyst mounting filter 6 is clogged with the unburned particles, thus increasing a pressure loss. In some cases, a large amount of unburned and collected particulates in the catalyst mounting filter 6 are ignited and cause damage to the catalyst mounting filter 6.

In order not to leave unburned particulates in the catalyst mounting filter 6, there is a countermeasure to increase a heat or thermal energy of the ceramic heater 4 so as to raise a temperature at the rear end portion of the catalyst mounting filter 6 to an ignition temperature of the particulate. With this countermeasure, however, a temperature at upstream side of the ceramic heater 4 is raised to exceed its allowable temperature. This causes breaking of a wire and degradation in durability of the ceramic heater 4. According to the conventional apparatus as mentioned above, the ceramic heater 4 must be used by getting its heat generation under control. Consequently, there is a problem that catalyst placed in downstream end portion of the catalyst mounting filter 6 is not activated sufficiently, and unburned particulates remain in that portion.

SUMMARY OF THE INVENTION

In view of the above, it is an object of the present invention to provide a diesel particulates removing apparatus by which it is capable of increasing capturing and removing rate of the particulates, of activating catalyst with low electric power, and therefore it is capable of burning and removing the captured particulates to ensure that the filter can be reused.

According to a first aspect of the present invention, there is provided a diesel particulates removing apparatus including;

- a cylindrical vessel having an inlet port and an outlet port for a diesel exhaust gas;
- a metallic heat generation body of roll-type or folding-type arranged at the inlet port in the cylindrical vessel; and
- a heat-resisting filter arranged in a subsequent stage of the metallic heat generation body in order to capture, burn, and eliminate the particulates in the diesel exhaust gas,
- wherein the metallic heat generation body is covered with a catalyst accelerating a burning of the captured particulates.

In the foregoing, a preferable mode is one wherein the metallic heat generation body is structured by rolling a belt-like metal along its longitudinal axis in a whirlpool shape or by folding the belt-like metal in a lamination, the belt-like metal having a number of through holes formed therein.

Also, a preferable mode is one wherein the metallic heat generation body is structured by rolling a belt-like metal along its longitudinal axis in a whirlpool shape or by folding the belt-like metal in a lamination, the belt-like metal having a longitudinal wave shape and a number of through holes formed therein.

A preferable mode is one wherein the metallic heat generation body is structured by rolling a belt-like metal along its longitudinal axis in a whirlpool shape or by folding the belt-like metal in a lamination, the belt-like metal having an uneven surface, an uneven back face, and a number of through holes formed therein.

Also, a preferable mode is one wherein the metallic heat generation body has a number of first through holes having a single or plural first thorns protruding outwardly from the surface of the belt-like metal and a number of second through holes having a single or plural second thorns protruding outwardly from the back face of the belt-like metal.

Also, a preferable mode is one wherein the metallic heat generation body has a number of first through holes having a single or plural first side walls being arranged to protrude outwardly from the surface of the belt-like metal at the whole circumference of the first through holes or a part of the circumference of the first through holes, and a number of second through holes having a single or plural second side walls being arranged to protrude outwardly from the back face of the belt-like metal at the whole circumference of the second through holes or a part of the circumference of the second through holes.

A preferable mode is one wherein the first or second thorns or a whole of or a part of the first or second side walls are formed in an overhang shape extending outwardly from the through holes.

Also, a preferable mode is one wherein the thorns and the side walls of various kinds associated with one or more of the through holes are structured to prevent each of the particulates from entering straight ahead into the metallic heat generation body through the inlet port of the cylindrical vessel.

A preferable mode is one wherein the first or second through holes have ceiling portions or eaves.

Also, a preferable mode is one wherein the catalyst is composed mainly of one or more compositions selected from a group of α-alumina, β-alumina, and γ-alumina.

Also, a preferable mode is one wherein the catalyst contains 68% to 78% of one or more compositions selected from the group of α-alumina, β-alumina, and γ-alumina.

Also, a preferable mode is one wherein the catalyst is composed mainly of one or more compositions selected from the group of α-alumina, β-alumina, and γ-alumina, and further composed of at least one substance selected from a group of palladium, rhodium, ruthenium, titanium, nickel, iron, and cobalt.

Also, a preferable mode is one wherein the catalyst has mainly one or more compositions selected from the group of α-alumina, β-alumina, and γ-alumina, contains ruthenium, and further contains at least one substance selected from a group of lithium girconate, titanium oxide, and potassium carbonate.

Also, a preferable mode is one wherein the heat-resisting filter has a structure identical with that of the metallic heat generation body provided that the heat-resisting filter fails to have a catalyst.

A preferable mode is one wherein the heat-resisting filter has a catalyst mounting filter arranged at a subsequent stage of the heat-resisting filter.

Also, a preferable mode is one wherein the catalyst mounting filter is a cylindrical filter having a catalyst mounted thereupon so as to accelerate burning of the captured particulates.

Also, a preferable mode is one wherein the catalyst mounting filter is a cylindrical filter including ceramics or alumina and having a catalyst mounted thereupon so as to accelerate burning of the captured particulates.

Also, a preferable mode is one wherein the catalyst mounting filter has a metal fiber arranged at a subsequent stage of the catalyst mounting filter.

Also, a preferable mode is one wherein the outlet port for a diesel exhaust gas is set to have an opening area larger than that of the inlet port.

According to a second aspect of the present invention, there is provided a diesel particulate removing apparatus including a plurality of particulate removing apparatus main bodies identical in structure with the diesel particulate removing apparatus according to one of claims 1 to 18, wherein the main bodies are arranged in parallel.

In the foregoing, a preferable mode is one wherein further including a hollow branched portion having one inlet port and N-pieces (N is a natural number over 2) of outlet ports for a diesel exhaust gas, a hollow junction portion having N-pieces of inlet ports and one outlet port for a diesel exhaust gas, and N-pieces of the particulate removing apparatus main bodies sandwiched between the outlet ports of the hollow branched portion and the inlet ports of the hollow junction portion so as to communicate with each other.

Also, a preferable mode is one wherein the hollow branched portion has a collision plate within the portion so as to assist speed reduction and dispersion of the diesel exhaust gas introduced from the inlet port.

A preferable mode is one wherein the outlet port of the hollow junction portion is set to have an opening area larger than that of the inlet port of the hollow branched portion.

Also, a preferable mode is one wherein the apparatus includes two or three of the particulate removing apparatus main bodies having the same structure with each other.

Also, a preferable mode is one wherein each of the metallic heat generation bodies in the N-pieces of the particulate removing apparatus main bodies is structured so that their ON state/OFF state is selectively controlled.

Also, a preferable mode is one wherein each of the N-pieces of metallic heat generation bodies respectively installed one by one in the N-pieces of particulate removing apparatus main bodies is structured so that their ON state/OFF state is changed over alternatively or sequentially at a predetermined time interval.

Also, a preferable mode is one wherein each of the N-pieces of particulate removing apparatus main bodies has an upstream-side thermo-sensor and a downstream side thermo-sensor, respectively placed near the inlet port and the outlet port, and wherein ON state/OFF state of corresponding the metallic heat generation bodies is controlled on a basis of a temperature difference between an upstream-side temperature detected by the upstream-side thermo-sensor and a downstream-side temperature detected by the downstream-side thermo-sensor.

Also, a preferable mode is one wherein when the upstream-side temperature is higher than the downstream-side temperature and a temperature difference between the upstream-side temperature and the downstream-side temperature is over a first standard value previously set, the metallic heat generation body is turned on, and when the downstream-side temperature is higher than the upstream-side temperature and a temperature difference the downstream-side temperature and the upstream-side temperature is over a second standard value previously set, the metallic heat generation body is turned off in a sequential manner.

A preferable mode is one wherein the apparatus includes N-pieces of the particulate removing apparatus main bodies of the same structure with each other, wherein when the metallic heat generation body of a first of the particulate removing apparatus main bodies is in an ON state, the downstream-side temperature associated with the first of the particulate removing apparatus main bodies becomes higher than the upstream-side temperature, and when a temperature difference between these two temperatures is over the second standard value previously set, the metallic heat generation body is turned off, then, when the upstream-side temperature associated with the second of the particulate removing apparatus main bodies becomes higher than the downstream-side temperature, and when a temperature difference between these two temperatures is over the first standard value previously set, the metallic heat generation body is turned on, and wherein as a result of the turn ON state, when the downstream-side temperature associated with the second particulate removing apparatus main bodies becomes higher than the upstream-side temperature, and when a temperature difference between these two temperatures is over the second standard value previously set, the metallic heat generation body is turned off, and thereafter the ON/OFF operations are repeated in a sequential manner.

A preferable mode is one wherein the first and/or second standard values are ranging from 5° C. to 15° C.

Also, a preferable mode is one wherein each of the particulate removing apparatus main bodies has pressure sensors at its predetermined positions, and an ON state of corresponding the metallic heat generation body is controlled on a basis of detection results of the pressure sensors.

Also, a preferable mode is one wherein the inlet port of each of the particulate removing apparatus main bodies has a change-over valve installed thereon, and the valve is controlled to be closed when the metallic heat generation body is in an OFF state.

BRIEF DESCRIPTION OF THE DRAWINGS

The above and other objects, advantages and features of the present invention will be more apparent from the following description taken in conjunction with the accompanying drawing in which.

DETAILED DESCRIPTION OF THE PREFERRED EMBODIMENTS

Best modes for carrying out the present invention will be described in further detail using various embodiments with reference to the accompanying drawings.

EMBODIMENTS

First Embodiment

Figure 1:
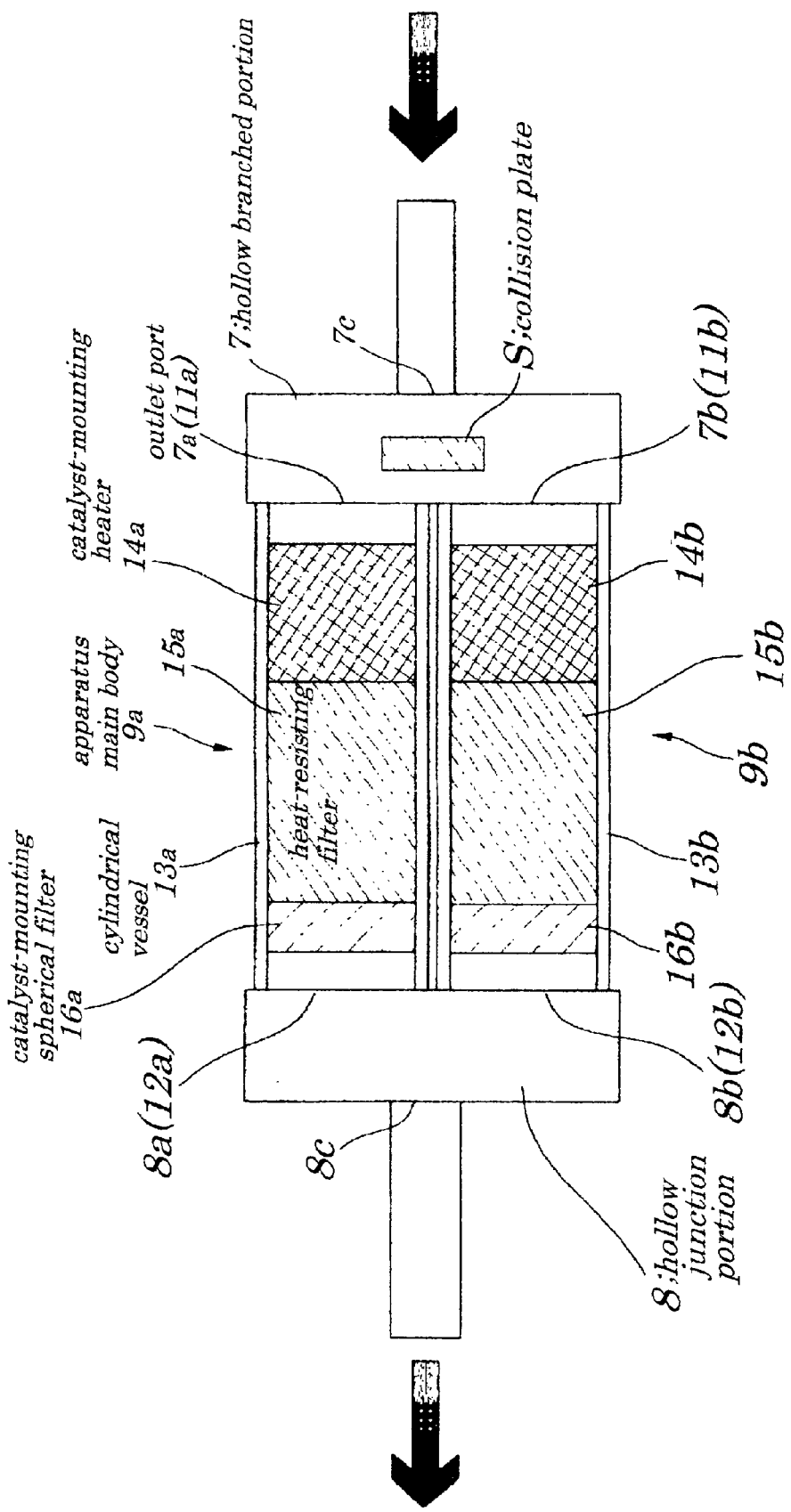
FIG. 1 is a model sectional view showing an outline structure of a two-vessel type diesel particulate removing apparatus according to a first embodiment of the present invention.
Figure 2:
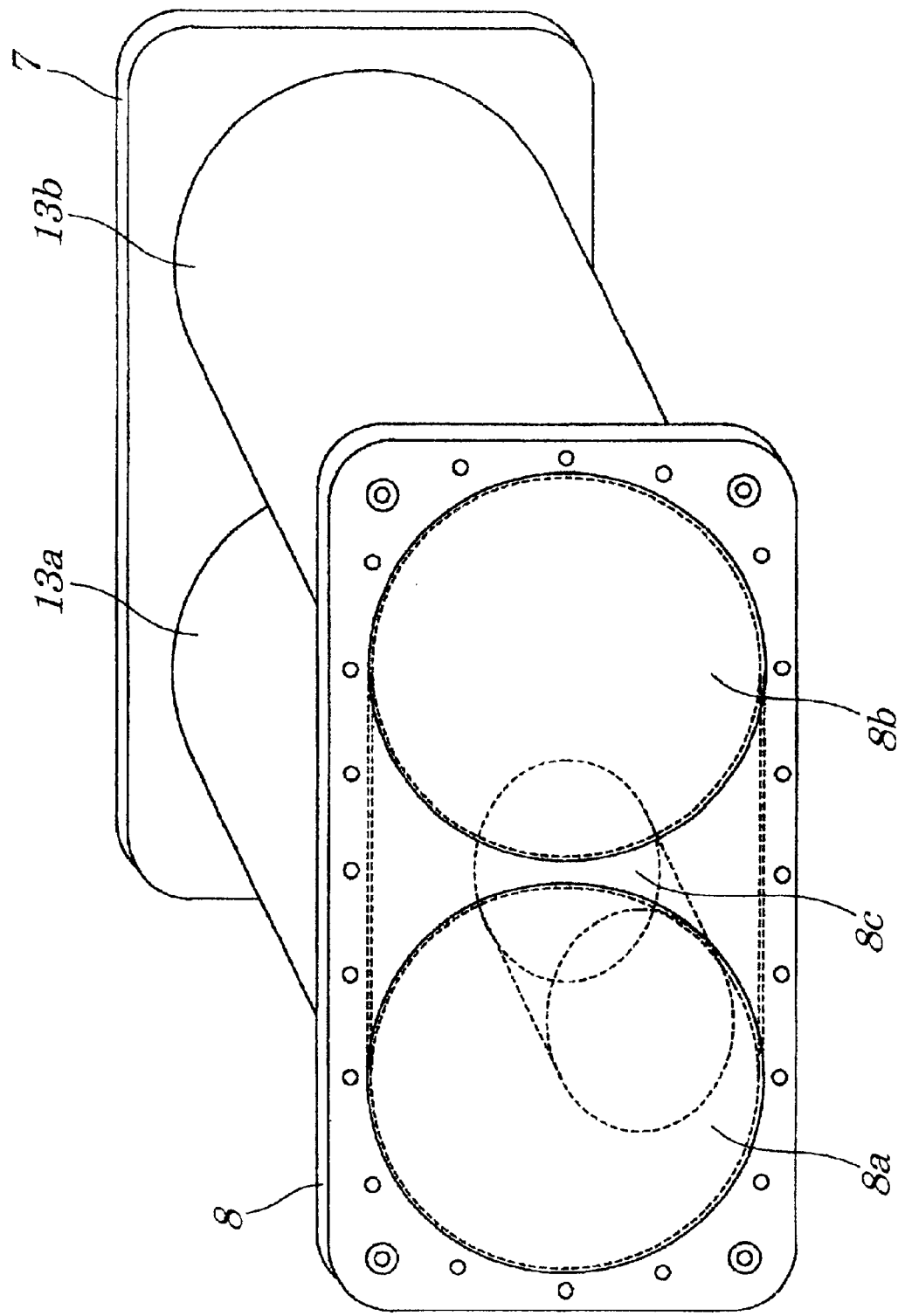
FIG. 2 is a front view of the two-vessel type diesel particulate removing apparatus.
Figure 3:
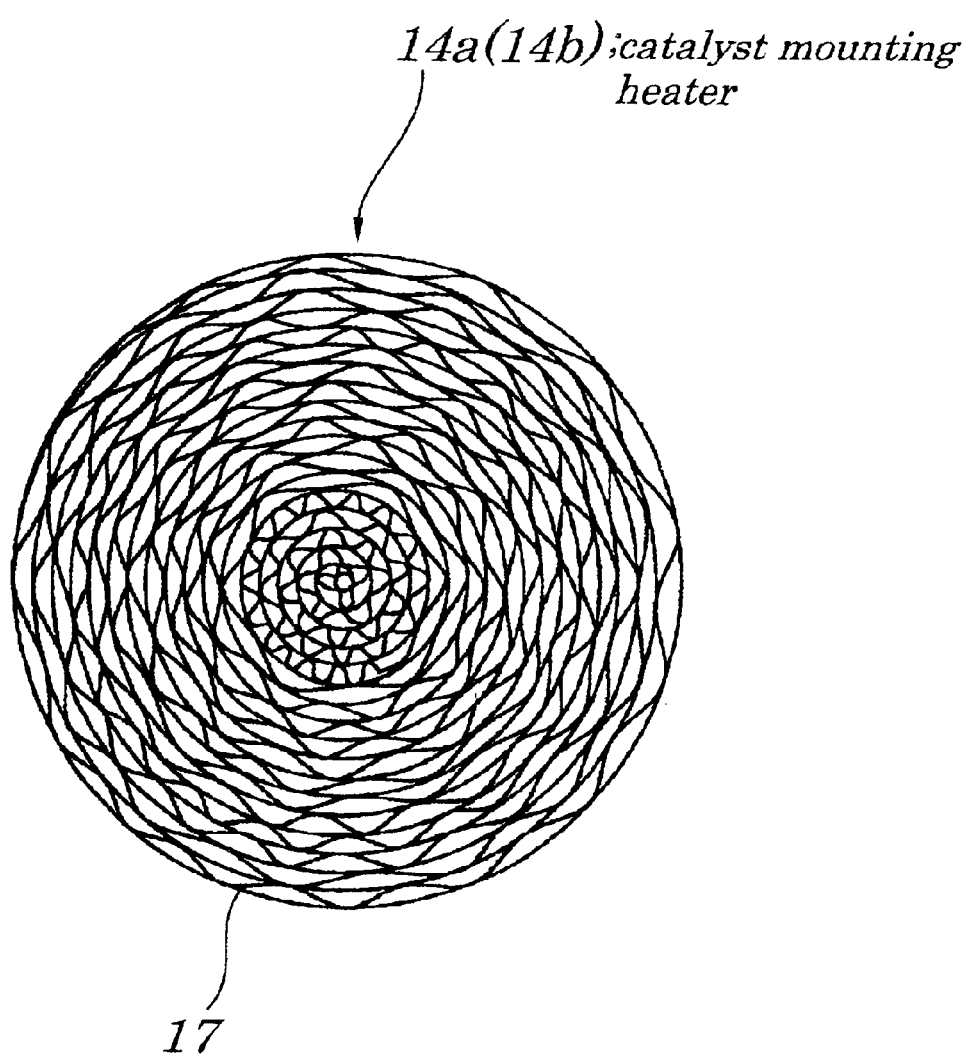
FIG. 3 is a plan view of a catalyst mounting heater structuring the two-vessel type diesel particulate removing apparatus.
Figure 4:
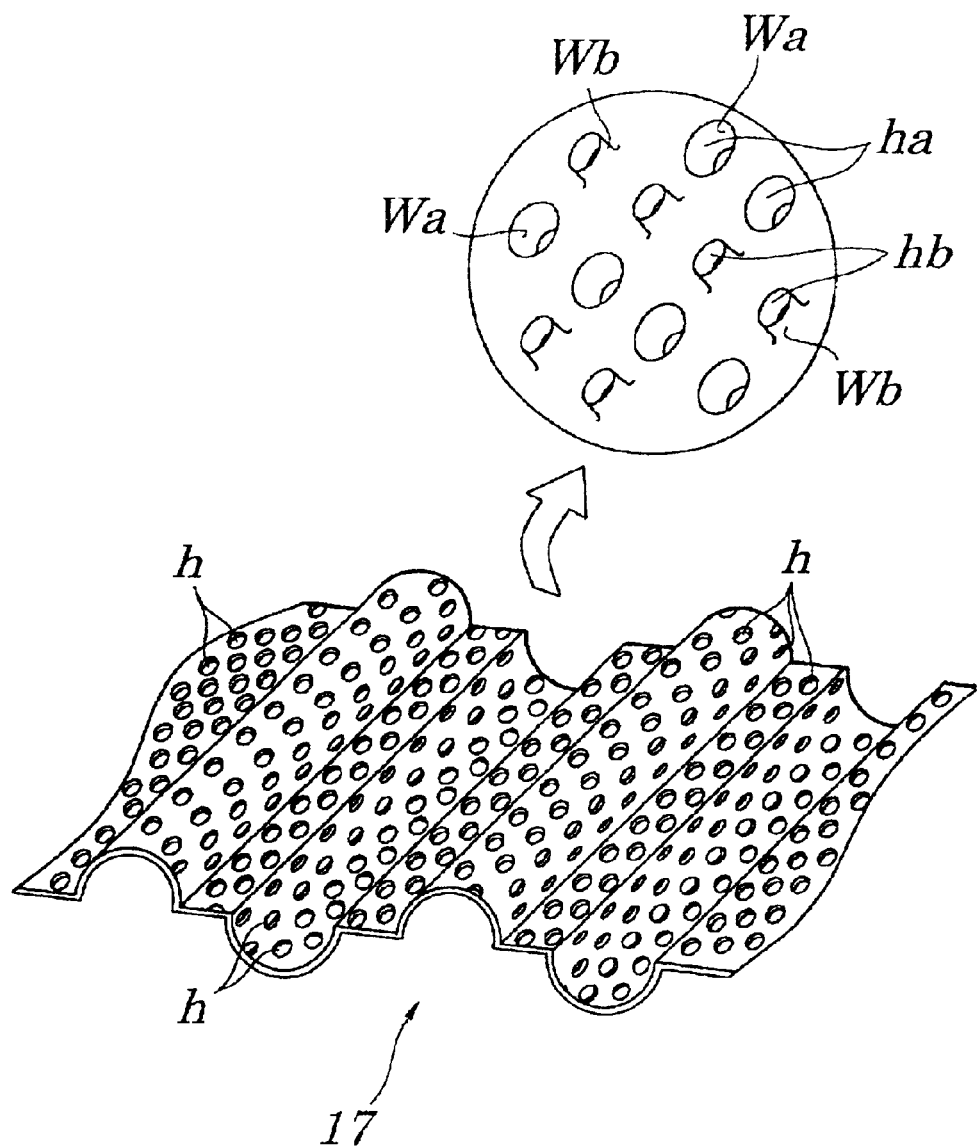
FIG. 4 is an enlarged view of a metal heater structuring the catalyst mounting heater.
Figure 5:
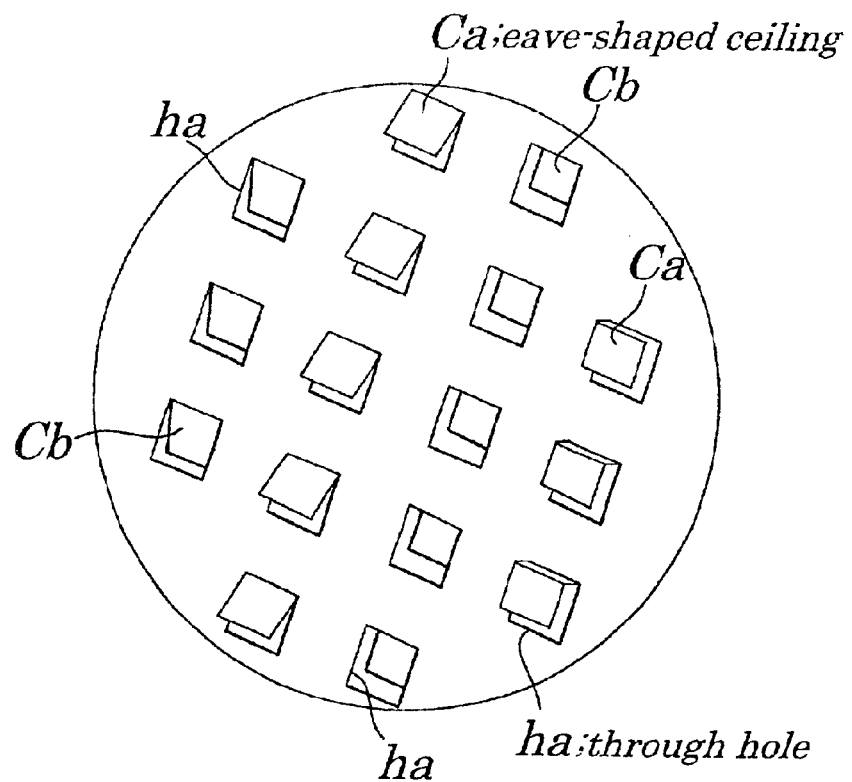
FIG. 5 is a partly enlarged view showing apart of a catalyst mounting heater according to a modification of the present invention.
Figure 6:
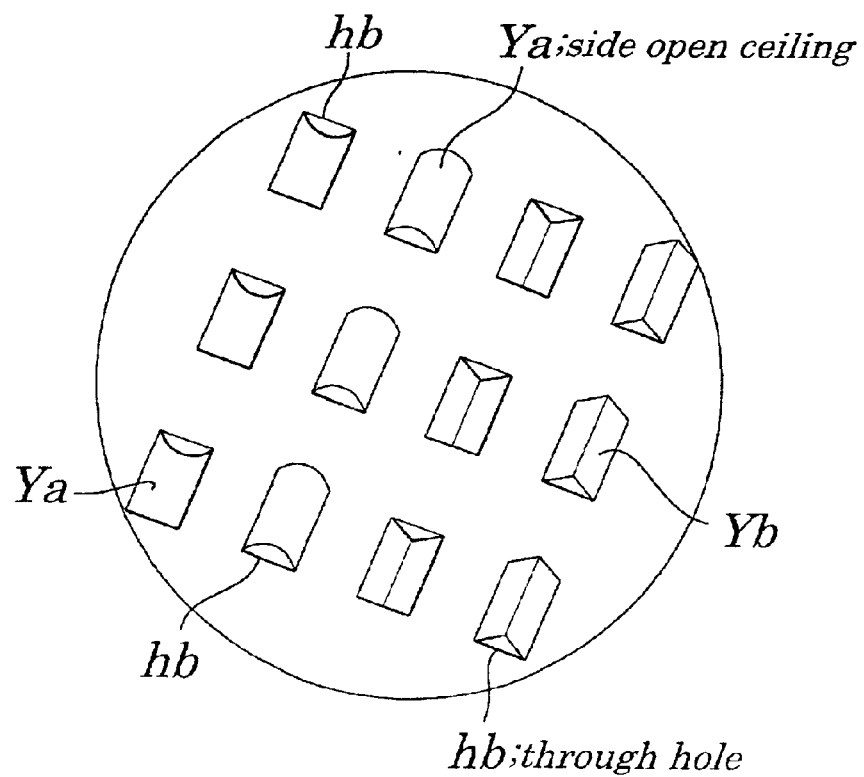
FIG. 6 is a partly enlarged view showing apart of a catalyst mounting heater according to another modification of the present invention.
Figure 7:
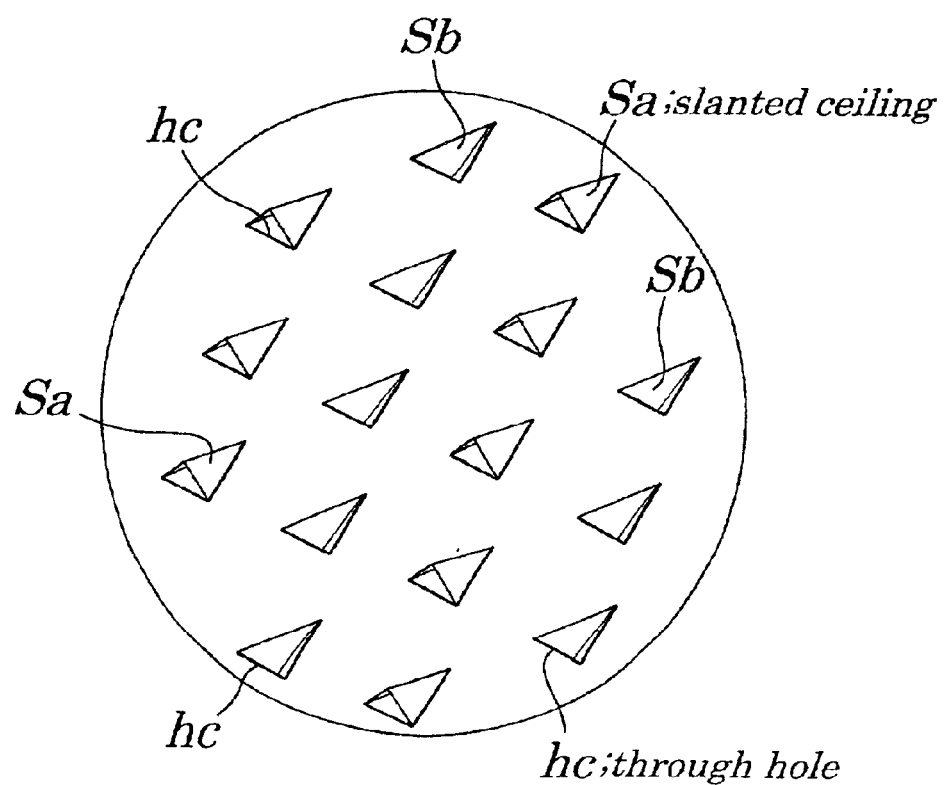
FIG. 7 is a partly enlarged view showing a part of catalyst mounting heater according to still another modification of the present invention.
Figure 8:
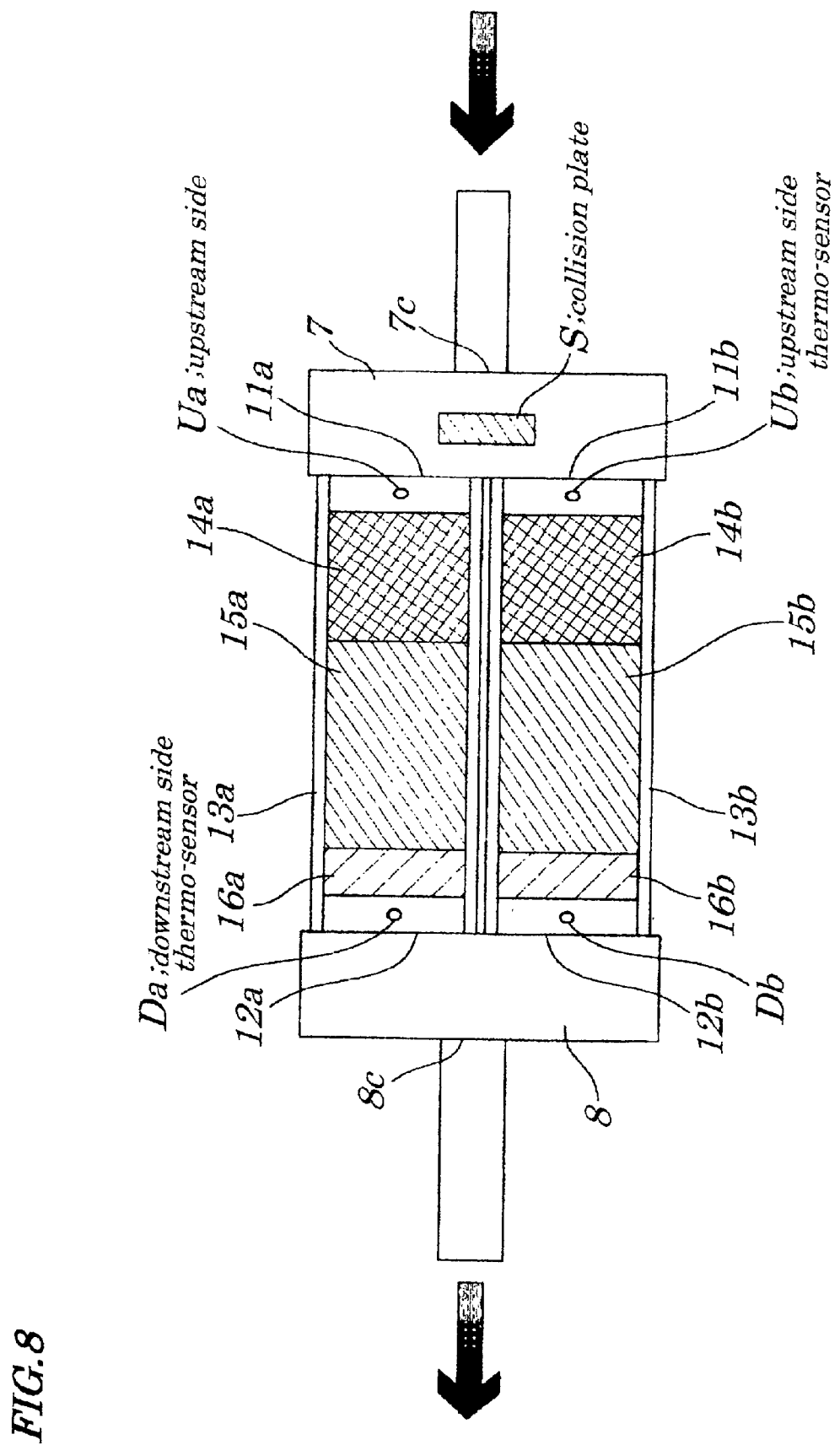
FIG. 8 is a view of the operation according to still another modification of the present invention.
Figure 9:
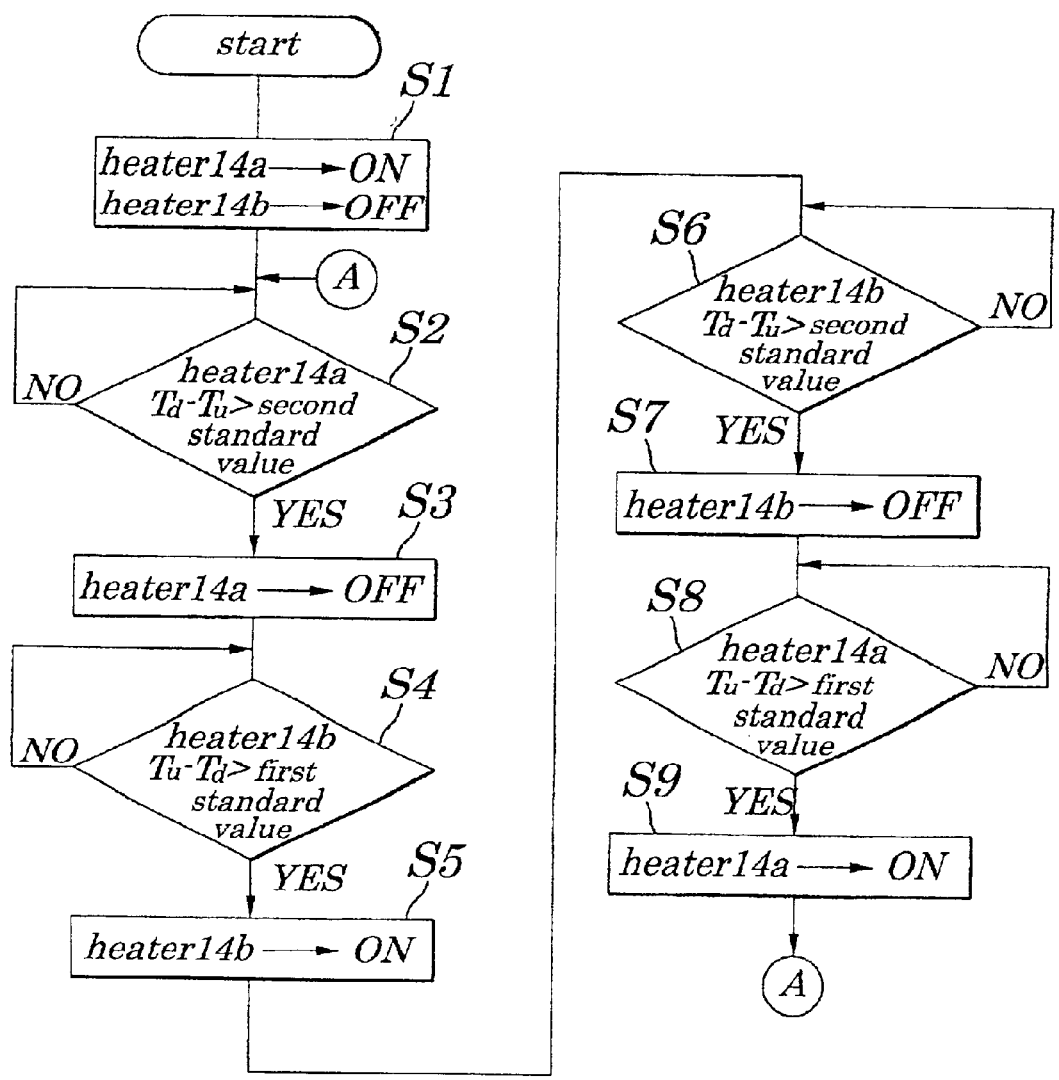
FIG. 9 is a flowchart showing operation processing steps of the first embodiment.

FIG. 1 is a sectional view showing an outline structure of a two-vessel type diesel particulate removing apparatus (hereinafter referred to as a two-vessel type apparatus) according to the first embodiment of the present invention; FIG. 2 is a front view of the two-vessel type apparatus; FIG. 3 is a diagrammatical front view of a catalyst mounting heater constituting the two-vessel type apparatus; FIG. 4 is an expanded view of a metallic heater constituting the catalyst mounting heater; FIG. 5 is a partly enlarged view of a catalyst mounting heater according to a modification; FIG. 6 is a partly enlarged view of a catalyst mounting heater according to another modification; FIG. 7 is a catalyst mounting heater according to still another modification; FIG. 8 is an explanatory view of an operation of the embodiment; and FIG. 9 is a flowchart showing operation processing steps of the embodiment.

The two-vessel type apparatus is mounted and used in a diesel vehicle. As shown in FIG. 1, the two-vessel type apparatus mainly comprises a hollow branched portion 7 having one inlet port 7c and two outlet ports 7a and 7b for a diesel exhaust gas, a hollow junction portion 8 having two inlet ports 8a and 8b and one outlet port 8c for a diesel exhaust gas, and two apparatus main bodies 9a, 9b (hereinafter may be also referred to as vessels) of the same structure communicating with the outlet ports 7a and 7b of the hollow branched portion 7 and the inlet ports 8a and 8b of the hollow junction portion 8. A collision plate S is placed in an interior of the hollow branched portion 7 so as to reduce the current speed of a diesel exhaust gas introduced at a higher speed from the inlet port 7c and to disperse the gas uniformly in the outlet ports 7a and 7b.

Apparatus main bodies 9a and 9b respectively have catalyst mounting heaters 14a and 14b having a three-layer catching structure of roll-type, heat-resisting filters 15a and 15b and the catalyst mounting cylindrical filters 16a and 16b, arranged in an order described above. These catalyst mounting heaters 14a and 14b, heat-resisting filters 15a and 15b, and catalyst mounting spherical filters 16a and 16b are housed in cylindrical vessels 13a and 13b provided with inlet ports 11a, 11b and outlet ports 12a, 12b for a diesel exhaust gas.

The catalyst mounting heaters 14a and 14b are manufactured by applying, for example, a press machining, a roller press machining on a belt-like metal plate obtaining a (longitudinal wave-shape type) belt-like metal plate 17 with a number of through holes h as shown in FIG. 4. Then, the belt-like metal plate 17 is rolled in a whirlpool shape as shown in FIG. 3 and catalyst is coated on the rolled plate by, for example, a spraying method or a dipping method. As shown in an enlarged view of FIG. 4, a whole circumference edge of the belt-like metal plate 17 has a number of first through holes ha having a first circular side wall Wa protruding from a surface of the circumference edge to an outside of a surface side and a number of second through holes hb having a second circular side wall Wb protruding from a rear face of the circumference edge to an outside of a rear side. The purpose of a provision of the through holes his to raise an electric resistance of the belt-like metal plate 17 and use it as an electric heater and make the diesel exhaust particulates possible to move along a radial direction of the catalyst mounting heaters 14a and 14b, raising a collision ratio of particles with the catalyst mounting heaters 14a and 14b and extending a staying time of particles in the catalyst mounting heaters 14a and 14b. The first circular side wall Wa and second circular side wall Wb are provided to supplement a decrease of a contact area due to the through holes h, raise a collision ratio of particles with the catalyst mounting heaters 14a and 14b, prevent the diesel exhaust particles from advancing straight for extending a stay time of particles, and prevent detachment of the catalyst owing to an exhaust gas flowing therein. Furthermore, in this embodiment, in order to raise heater collision ratio of diesel exhaust particulates, each particulate introduced from the inlet ports 11a and 11b of cylindrical vessels 13a and 13b into gaps of the catalyst mounting heaters 14a and 14b is certainly hindered from advancing straight by the side walls Wa and Wb of one or plural through holes h.

It is noted that it is not necessary to provide the side walls Wa and Wb on a whole circumference of each through hole h. A single of or a plurality of side walls may be provided on apart of the circumference of each through hole. It is preferable that the side walls are formed with an overhang shape extending outwardly from the circumference in order to improve function of preventing detachment of catalyst. In place of the side walls Wa and Wb, thorns including beardlike projections or burr-like projections are employed. If necessary, these side walls Wa and Wb may be omitted. These through holes are also made of through holes ha with eave-shaped ceilings Ca and Cb as shown in FIG. 5, of the through holes hb with side open ceilings Ya and Yb as shown in FIG. 6, and of through holes hc with slanted ceilings Sa and Sb as shown in FIG. 7. The directions of eave-shaped ceilings Ca and Cb, side open ceilings Ya and Yb and slanted ceilings Sa and Sb are preferably selected and determined in various cases. The through holes h, ha, hb, and hc are preferably mixed on a metal plate 17. Density of the through holes are arbitrarily selected.

It is preferable to employ such material for the belt-like metal plate 17, as one containing mainly a stainless steel and other materials such as aluminum, copper and nickel. From the viewpoints of stability and durability of a catalyst function, the preferable material is one that accelerates function of catalyst and burning of captured particulates, and its composition is mainly one or plural composites selected from a group of α-alumina, β-alumina, and γ-alumina. More preferable one is that containing 68% through 78% of the composites. In more detail, the material containing mainly one or plural composites selected from α-alumina, β-alumina, and γ-alumina, and further containing at least one selected from a group of palladium, rhodium, ruthenium, titanium, nickel, iron, and cobalt, is suitable, because it is excellent in its catalyst reactivity and high in its reactive heat generation value. Further, another preferable material for the belt-like metal plate 17 is one that contains mainly one or plural composites selected from α-alumina, β-alumina and γ-alumina and further contains at least one of lithium zirconate, titanium oxide or potassium carbonate, since it generates a large volume of reaction heat. In the present embodiment, a catalyst of α-alumina: 73.0%, luthenium: 18.0%, lithium zirconate: 7.0%, titanium oxide: 1.7%, and potassium carbonate: 0.3% is used.

The heat-resisting filters 15a and 15b have a structure identical with that of the metal heat generation body except that the filters do not have a catalyst. These heat-resisting filters 15a and 15b are placed at the back of the catalyst mounting heaters 14a and 14b and contacted with the catalyst mounting heaters 14a and 14b through insulators (not shown), so as to catch the particulates in a diesel exhaust gas and burn to remove them.

The catalyst mounting spherical filters 16a and 16b have cylindrical filters made of ceramics or alumina and the catalyst for accelerating a burning of the captured particulates. The catalyst mounting cylindrical filters 16a and 16b are placed at the back of the heat-resisting filters 15a and 15b and contacted with the heat-resisting filters 15a and 15b.

Next, an electric structure of the two-vessel type apparatus according to the first embodiment of the present invention will be explained in brief.

The catalyst mounting heaters 14a and 14b are adapted to be supplied with electricity by a battery of the diesel vehicle.

As shown in FIG. 8, upstream-side thermo-sensors Ua, Ub and downstream side thermo-sensors Da, Db are installed near the inlet ports 11a, 11b and the outlet ports 12a, 12b of respective apparatus main bodies 9a, 9b. As will be described, ON/OFF state of the corresponding catalyst mounting heaters 14a or 14b are determined on the basis of the temperature difference between the upstream-side temperature Tu detected by the upstream-side thermo-sensors Ua, Ub and the downstream-side temperature Td detected by the downstream side thermo-sensors Da, Db. That is, when the upstream-side temperature Tu is higher than the downstream-side temperature Td and the temperature difference (Tu−Td) is over the first standard value (preferably, it has a range of 5° C. to 15° C.; in this case it is 5° C.), the catalyst mounting heater 14a or 14b is changed from OFF state to ON state. While, when the downstream-side temperature Td is higher than the upstream-side temperature Tu and the temperature difference (Td−Tu) is over the second standard value (preferably it is in a range of 5° C. to 15° C.; in this case it is 5° C.), the catalyst mounting heater 14a or 14b is changed from ON state to OFF state. According to the present embodiment, in principle, either the catalyst mounting heater 14a or 14b is turned ON because of the battery power. In this manner, the heaters are alternately turned ON. The heaters are permitted to take an OFF state simultaneously.

When the catalyst mounting heater 14a or 14b is placed in an OFF state, and the temperature difference (Tu−Td)

reaches the first standard value, the catalyst mounting heater 14a or 14b is then changed from OFF state to ON state. The reason for such change is as follows.

When the catalyst mounting heater 14a or 14b is in a state of OFF, a catalyst activity is low and poor, so that many unburned particulates are generated. As a result, the catalyst mounting cylindrical filter 16a or 16b at the downstream side is clogged, which causes a back pressure to rise, and therefore the system associated with an engine and exhaust is in danger of being damaged. In this situation, a temperature at the upstream side which initially receives a heat of a diesel exhaust gas becomes higher than that at the downstream side. The temperature difference (Tu−Td) is inclined to rise with elapse of time. In views of this, when the temperature difference (Tu−Td) detected by using the upstream-side thermo-sensors Ua, Ub and the downstream side thermo-sensors Da, Db is over the first standard value, it is determined that clogging is developing in the downstream side catalyst mounting cylindrical filter 16a or 16b. The catalyst mounting heater 14a or 14b is then turned from an OFF state to an ON state in order to burn and remove unburned particles captured in the catalyst mounting cylindrical filter 16a or 16b.

In a case where the catalyst mounting heater 14a or 14b is in an ON state, and a temperature difference (Td−Tu) reaches the second standard value, the catalyst mounting heater 14a or 14b is changed over from an ON state to an OFF state. The reason for this change over will be described below.

When the catalyst mounting heater 14a or 14b is in an ON state, the heater receives a diesel exhaust gas with a high temperature caused by a catalyst reaction heat and also receives a conductive heat from high-temperature catalyst mounting heater 14a. This results in that downstream side has a higher temperature than that of the upstream side. The temperature difference (Td−Tu) has a tendency to increase with elapse of time. To solve this problem, when the temperature difference (Td−Tu) detected by using the downstream side thermo-sensors Da, Db and the upstream-side thermo-sensors Ua,Ub is over the second standard value, it is determined that the catalyst is activated too much. The catalyst mounting heater 14a or 14b is then changed from an ON state to an OFF state to prevent component parts of the catalyst mounting heater 14a or 14b from being thermally damaged.

According to the diesel vehicle having the two-vessel type apparatus with the above structure, at the time of a cold start, a control portion (not shown) turns on only the catalyst mounting heater 14a which is housed in one apparatus main body, for example, the apparatus main body 9a. At this time, another catalyst mounting heater, the heater 14b, housed in another apparatus main body 9b is kept being in an OFF state (see step S1 of FIG. 9).

As a result, the catalyst mounting heater 14a is heated and the catalyst is activated. In this condition, when particulates contained in a diesel exhaust gas contact the catalyst mounting heater 14a and are captured in that heater, the fine particles are burned and removed with the aid of a heat generated by reaction with the catalyst. When particulates collide with the first and second circular sidewalls Wa, Wb and the ceilings Ca, Cb, Ya, Yb, Sa, and Sb on which the catalyst is mounted, the particulates are burned and removed. The particulates which have touched but not captured by the side walls Wa, Wb and the first and second circular ceilings Ca, Cb, Ya, Yb, Sa, and Sb, are reflected and move from gap to gap via the through holes. This movement increases the chances or probability that the fine particles contact the catalyst mounting heater 14. As a result of this, a particle contact ratio considerably increases compared with that of a conventional apparatus and probability of burning also increases. The number of unburned particulates passing through the catalyst mounting heater 14a without stopping therefore decreases. However, the particulates unburned and passing through the catalyst mounting heater 14a are once captured by the heat-resisting filter 15a, they are destined to be ignited, burned, and removed. This is caused by the heat-resisting filter 15a which has a higher temperature than that of the catalyst mounting heater 14a because it receives a diesel exhaust gas with a high temperature by a catalyst reaction heat and a conductive heat from high-temperature catalyst mounting heater 14a. Still, there exists unburned particulates which pass through or sneak through the heat-resisting filter 15a. When such unburned particulates contact the catalyst mounting spherical filter 16a activated by a hot diesel exhaust gas, they are burned and removed. A performance test executed shows that more than 80% of particulates are removed.

With respect to the apparatus main body 9a provided with the catalyst mounting heater 14a which is in an ON state, the downstream side exposed to a hot diesel exhaust gas has a temperature higher than that of the upstream side, and the temperature difference (Td−Tu) increases with elapse of time.

When the temperature difference (Td−Tu) detected by the downstream side thermo-sensor Da and the upstream-side thermo-sensor Ua is over 5° C., the second standard value previously set (step S2), a control portion makes the catalyst mounting heater 14a OFF (step S3). Resultantly, too much activation of the catalyst is prevented and a thermal damage of the structural parts of the catalyst mounting heater 14a and others can be avoided.

While, the catalyst mounting heater 14b in another apparatus main body 9b is kept in its OFF state (step S1), and the catalyst fails to reach its activation temperature. For that reason, many unburned particulates are flown to the downstream side and contact to be captured in the heat-resisting filter 15b and the catalyst mounting cylindrical filter 16b. The temperature of the heat-resisting filter 15b and the catalyst mounting cylindrical filter 16b at this time is, however, lower than a burning temperature of unburned particulates, therefore the captured unburned particulates do not burn and are not removed. As a result, a clogged condition of the heat-resisting filter 15b and the catalyst mounting cylindrical filter 16b advances or develops. Speaking of a thermal relationship, the temperature of the upstream-side first receiving a heat of a diesel exhaust gas becomes higher than the downstream side as described above, the temperature difference (Tu−Td) increases with elapse of time. When the temperature difference determined and detected by the upstream-side thermo-sensor Ub and the downstream side thermo-sensor Db is over the first standard value (step S4), the control portion judges that a clogging in the catalyst mounting cylindrical filter 16b at the downstream side has advanced and an OFF state of the catalyst mounting heater 14b is changed to an ON state (step S5). Accordingly, a temperature of a catalyst in the catalyst mounting heater 14b reaches its active one, thus burning the particulates contacted with the catalyst and raising a temperature of a diesel exhaust gas instantly.

The downstream side is exposed with a hot diesel exhaust gas and heated, and many of the unburned particulates captured in the catalyst mounting spherical filter 16b and others are burned and removed. As a result, a rise in a back pressure which lowers the engine efficiency and causes damage to the exhaust system can be prevented.

The control portion keeps monitoring the temperature difference (Td−Tu) between the upstream side and the downstream side in the apparatus main body 9b in the step S6. In the apparatus main body 9b having the catalyst mounting heater 14b in its ON state, the downstream side is exposed more to the diesel exhaust gas of a higher temperature than the upstream side, so that the temperature difference (Td−Tu) increases with elapse of time.

When the temperature difference (Td−Tu) detected and determined by the downstream side thermo-sensor Db and the upstream-side thermo-sensor Ub is over the second standard value (5° C.) previously set (step S6), the catalyst mounting heater 14b is turned to an OFF state (step S7). Thus, an over activation of the catalyst and thermal damage to the structural parts of the catalyst mounting heater 14b are prevented from happening.

Next, the control portion advances to step S8 and checks again the temperature difference (Tu−Td) between the upstream side and the downstream side in the apparatus main body 9a. In the apparatus main body 9a, the catalyst mounting heater 14a has been changed to an OFF state (step S3) and the catalyst is cooled to a level lower than its activating temperature. Consequently, many of the unburned particulates flow toward the downstream side and contact to be captured in the heat-resisting filter 15a and the catalyst mounting cylindrical filter 16a. However, in this condition, these heat-resisting filter 15a and catalyst mounting cylindrical filter 16a are cooler than the burning temperature of diesel exhaust particulates, so that the captured and unburned particulates do not burn and are not removed, resulting in a clogging advancement in the heat-resisting filter 15a and the catalyst mounting cylindrical filter 16a. Also, as described above, the upstream side which is initially exposed to the heat of a diesel exhaust gas becomes hotter than the downstream, so that the temperature difference (Tu−Td) increases with elapse of time.

When the temperature difference (Tu−Td) detected by the upstream-side thermo-sensor Ua and the downstream side thermo-sensor Da is over the first standard value (step S8), the control portion judges that a clogging is advancing in the downstream side catalyst mounting cylindrical filter 16a and others, changing the catalyst mounting heater 14a from an OFF state to an ON state(step S9). As a result, the temperature of a catalyst in the catalyst mounting heater 14a again reaches its activation one, thus burning the contacting particulates and instantly raising the temperature of the diesel exhaust gas. The downstream side is heated because it is exposed to a hot diesel exhaust gas, so that a large volume of unburned particulate captured in the catalyst mounting cylindrical filter 16a and others are burned and removed. Thus, a rise in a back pressure which lowers an engine performance and causes damage to the exhaust system is prevented. Hereinafter, returning to step S2 and the operations above are repeated.

According to the first embodiment of the present invention, a suitable catalyst is used and the catalyst mounting heaters 14a, 14b provided with a sophisticated shape of surface openings are used, and it is possible to raise a collection or catching ratio of the particulates. Also, the catalyst and the heater are integrally structured, so that it is possible to obtain a high-speed follow-up with respect to a change in temperature of the catalyst and to cut down a load on the battery lowering an electric power necessary for the apparatus. In other words, a low power is able to activate the catalyst and consequently the captured particulates are able to be burned and are removed more certainly. Because of the two-vessel structure and these catalyst mounting heaters 14a, 14b being used alternatively, a load burdened to one heater is made light and a durability of the apparatus is considerably improved.

Second Embodiment

Figure 10:
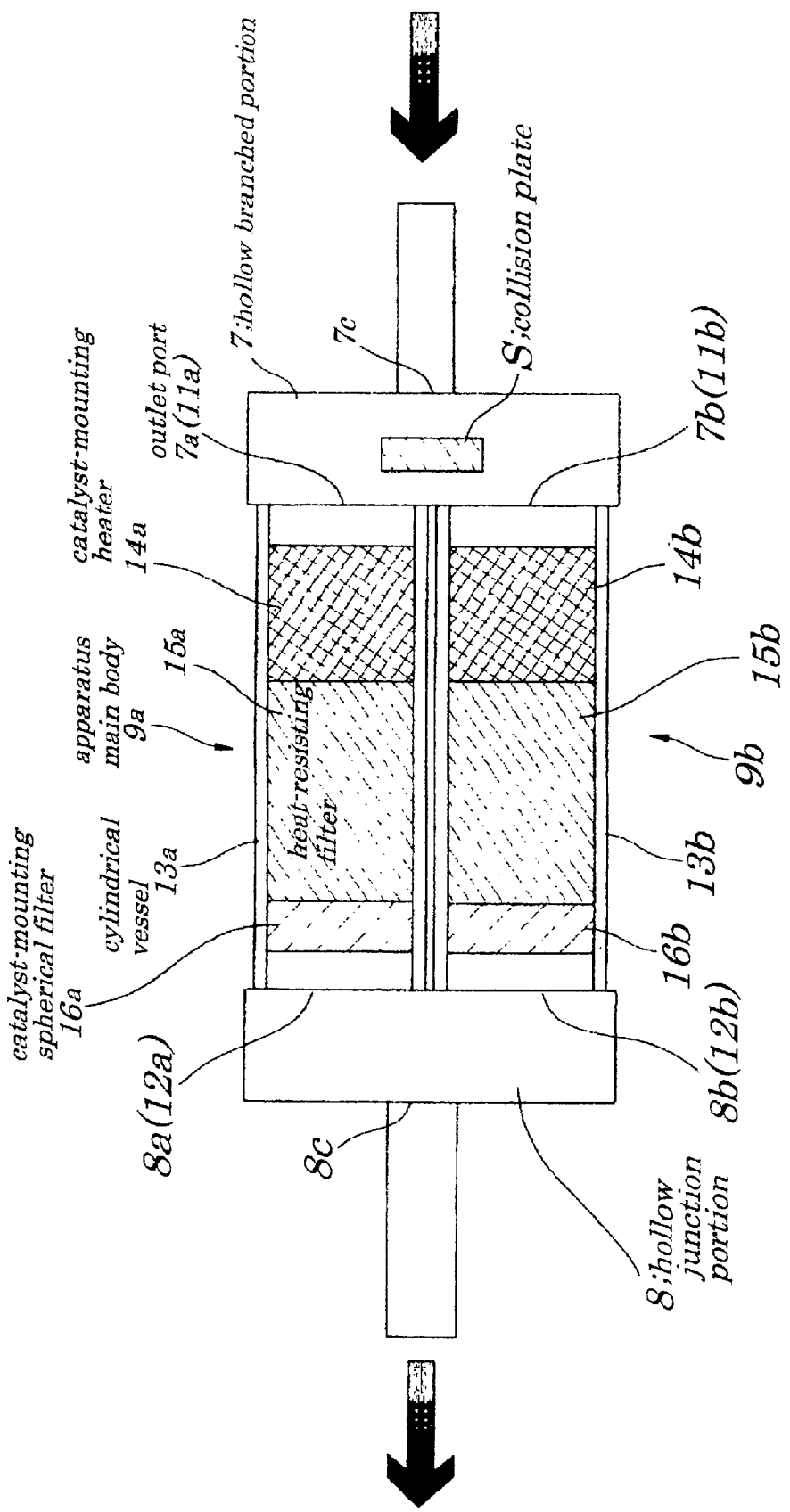
FIG. 10 is a sectional view showing an outline structure of a two-vessel type apparatus of a second embodiment of the present invention.

FIG. 10 is a sectional view showing an outline structure of a two-vessel type apparatus according to a second embodiment of the present invention. Structures of the two-vessel type apparatus of the second embodiment which are vastly different from that of the first embodiment, are described below. Metal fiber-made filters 18a, 18b are placed at the back of catalyst cylindrical filters 16a, 16b making an apparatus of a four-stage catching structure. Making the apparatus of such four-stage structure is able to expect a fine particulate removing ratio to be raised or improved extraordinarily.

Third Embodiment

Figure 11:
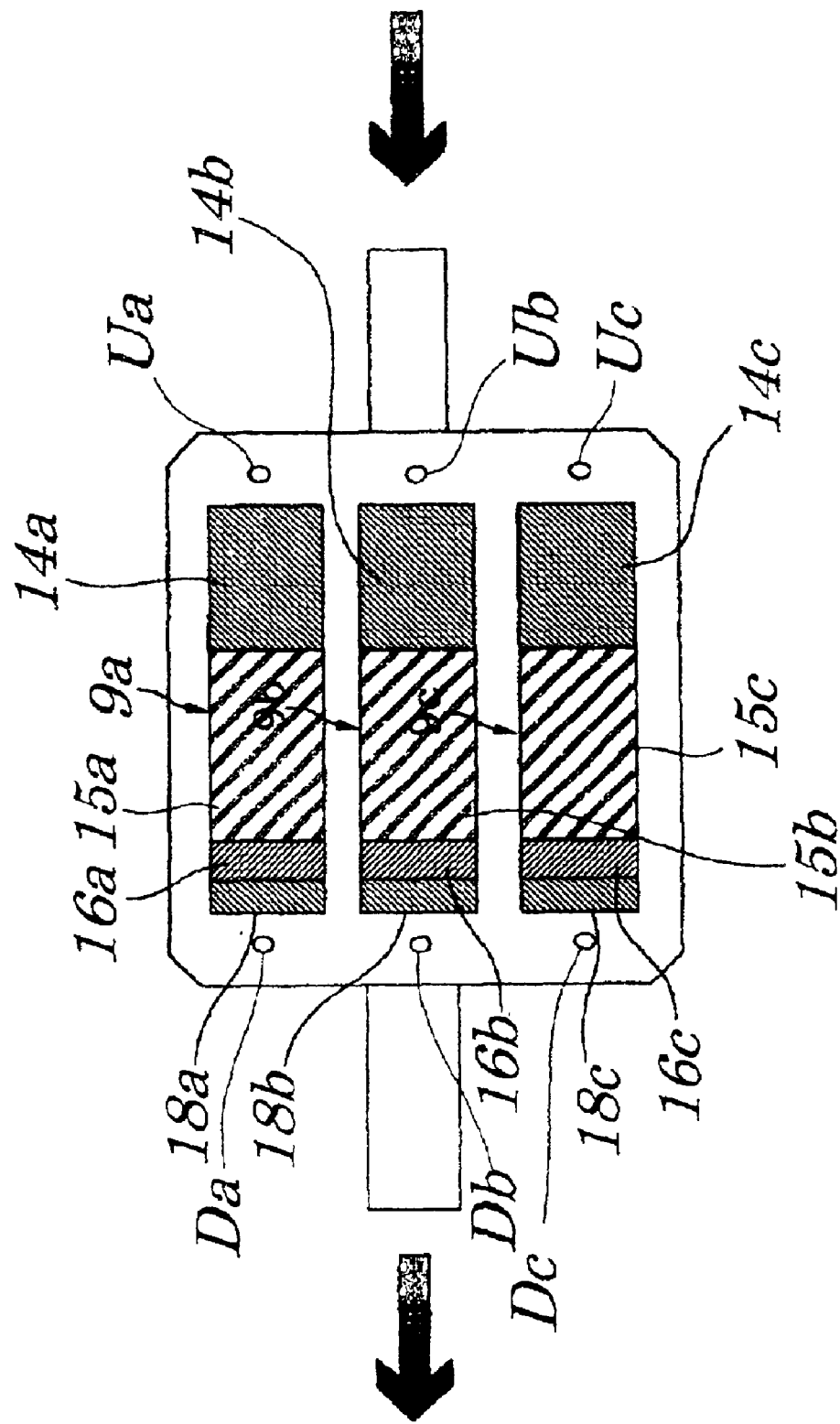
FIG. 11 is a sectional view showing a three-vessel diesel particulate removing apparatus of a third embodiment of the present invention.
Figure 12:
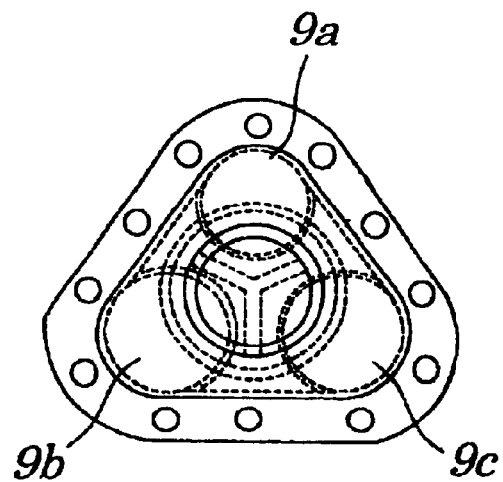
FIG. 12 is a front view of the three-vessel type diesel particulate removing apparatus of the third embodiment.
Figure 13:
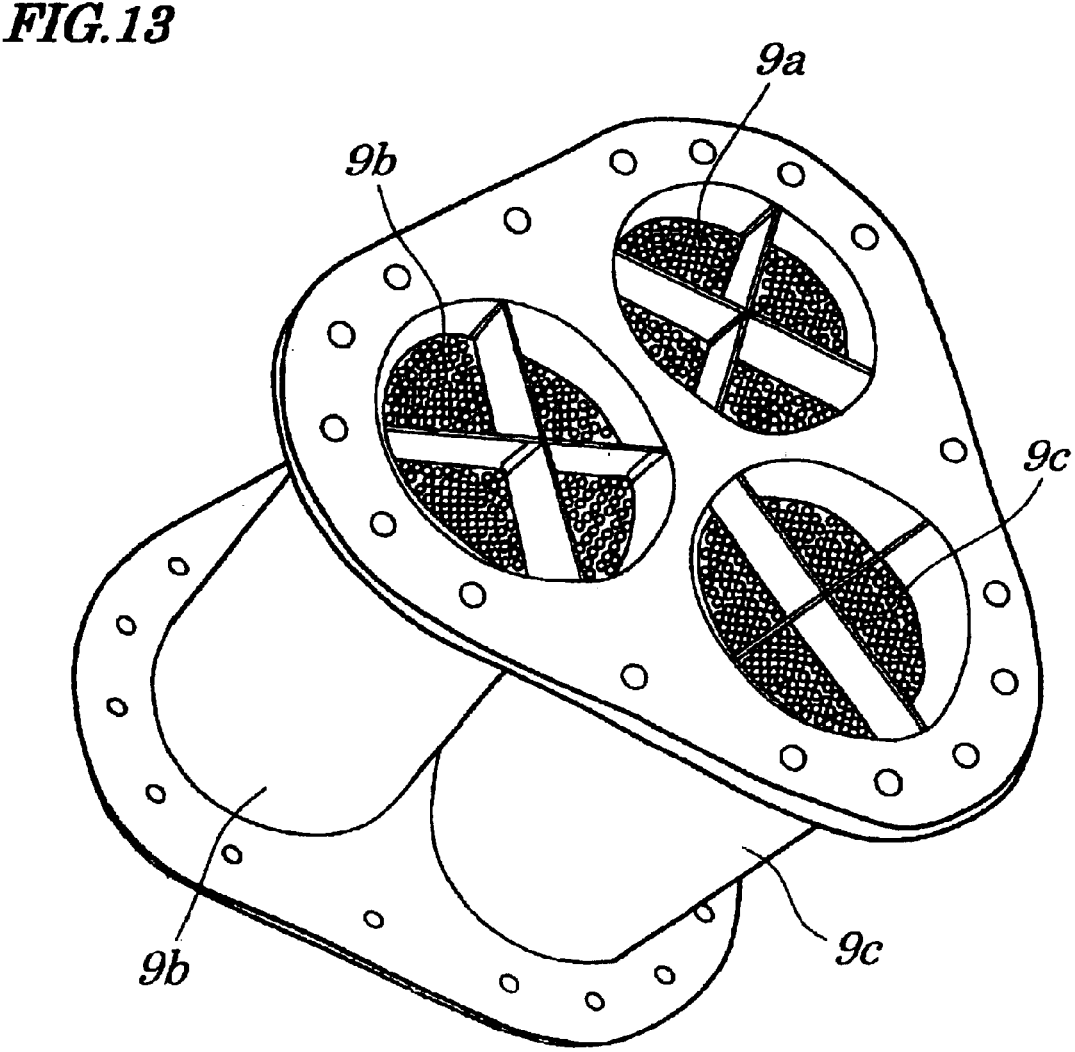
FIG. 13 is a perspective view of the three-vessel type diesel particulate removing apparatus of the third embodiment.
Figure 14:
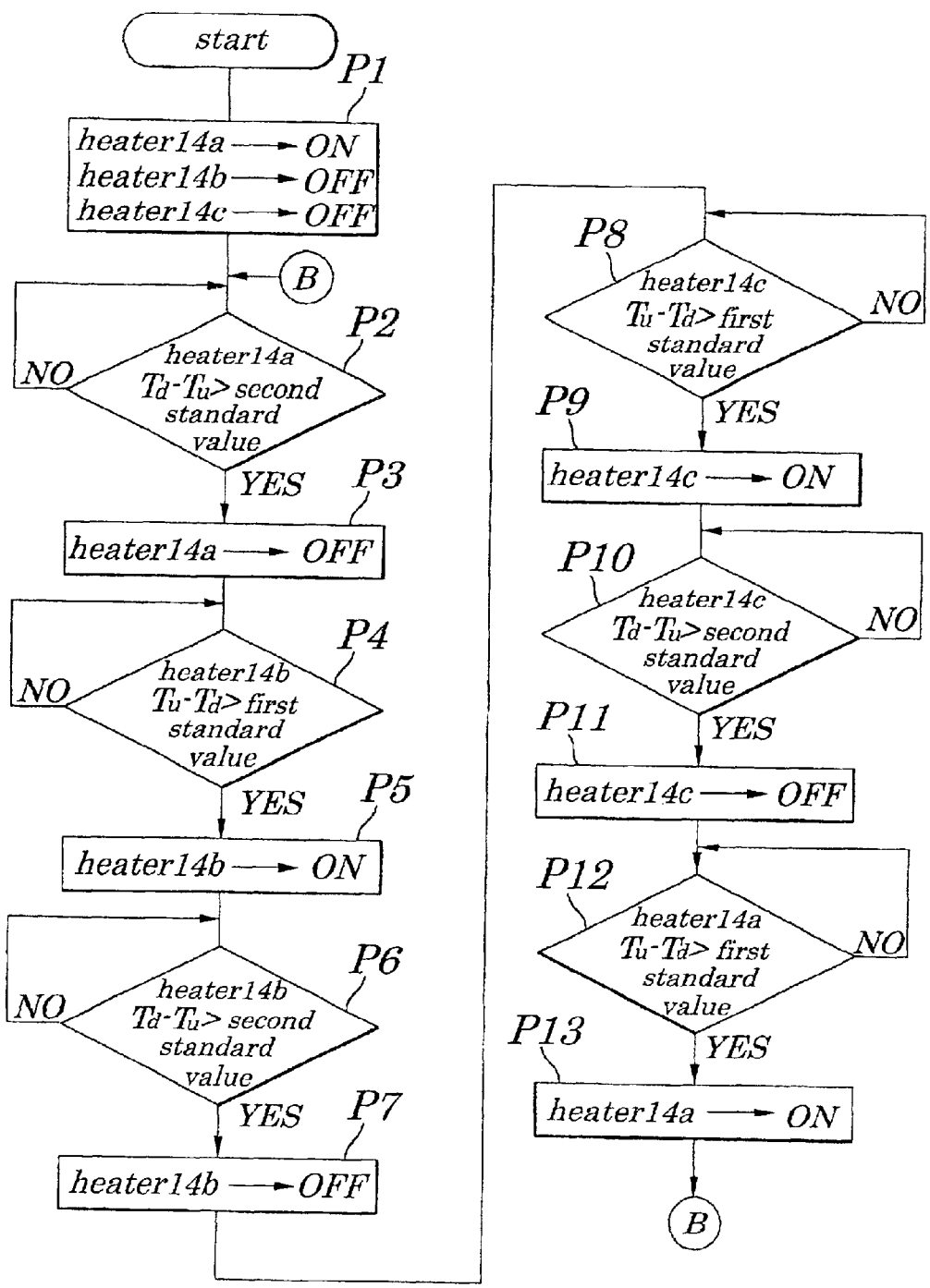
FIG. 14 is a flowchart explaining the operation of the three-vessel type diesel particulate removing apparatus of the third embodiment.

FIG. 11 is a sectional view showing an outline structure of a three-vessel type diesel particulate removing apparatus (hereinafter referred to as a three-vessel type apparatus) according to a third embodiment of the present invention; FIG. 12 is a front view of the three-vessel type apparatus; FIG. 13 is a perspective view of the three-vessel type apparatus, and FIG. 14 is a flowchart explaining operations of the third embodiment.

Structural difference of third embodiment from the second embodiment is that one vessel, an apparatus main body 9c, is added to apparatus main bodies 9a, 9b making a three-vessel structure.

When a diesel vehicle provided with the three-vessel structure above is subjected to a cold start, a control portion turns for example a catalyst mounting heater 14a placed within the apparatus main body 9a, to an ON state. Other catalyst mounting heaters 14a, 14c within the apparatus main bodies 9a, 9c are kept at their OFF state (step P1 of FIG. 14). Then, a catalyst mounting heater 14a is heated activating the catalyst. When particulates in a diesel exhaust gas touch and are captured in the catalyst mounting heater 14a, they are ignited and burned with the aid of generated heat due to a reaction with the catalyst, thus being removed. Owing to a burning of the particulates, a diesel exhaust gas proper is heated, which makes a heat-resisting filter 15a, a catalyst mounting cylindrical filter 16a, and a metal fiber filter 18a at the downstream side, respectively hot. When the particulates touch one of the catalyst mounting heater 14a, the heat-resisting filter 15a, the catalyst mounting spherical filter 16a and the metal fiber filter 18a, the fine particles are burned and removed. As a result, more than 80% of particulates are removed.

On the contrary, concerning the apparatus main body 9a provided with the catalyst mounting heater 14a in an ON state, the downstream side exposed to a high temperature diesel exhaust gas is made hotter than an upstream side and a temperature difference becomes large with elapse of time. In order to prevent the high temperature difference (Td−Tu) detected by a downstream side thermo-sensor Da and an upstream-side thermo-sensor Ua increases more than a second standard value of 5° C. previously set (step P2). The control portion turns on the catalyst mounting heater 14a (step P3). Thus, over activation of the catalyst and thermal damage to structural parts of the catalyst mounting heater 14a and others are hindered from happening.

Next, a control of the control portion advances to step P4 and again monitors the temperature difference (Tu–Td) between the upstream side and the downstream side in the apparatus main body 9b. At this time, the catalyst mounting heater 14b in the apparatus main body 9b is kept in an OFF state (step P1), so that a temperature of the catalyst is kept lower than its activation temperature. Consequently, many unburned particulates flow to the downstream side and contact to be captured by and collected in a heat-resisting filter 15b, a catalyst mounting cylindrical filter 16b and a metal fiber filter 18b. However, because temperatures of the heat-resisting filter 15b, the catalyst mounting cylindrical filter 16b and the metal fiber filter 18b are lower than the temperature of the burning diesel particulates, the captured but unburned particulates are not burned and removed. As a result, a clogged condition in the heat-resisting filter 15b and the catalyst mounting cylindrical filter 16b develops. Speaking of a thermal relationship, as described above, the upstream side receives initially thermal energy of a diesel exhaust gas heated to a level higher than that of the downstream side, and the temperature difference (Tu–Td) increases with elapse of time.

When the temperature difference (Tu–Td) detected and determined by an upstream-side thermo-sensor Ub and a downstream side thermo-sensor Db is over a first standard value (step P4), a control portion determines that a clogged condition is advancing in the catalyst mounting spherical filter 16b and others at the downstream side, changing the OFF state of the catalyst mounting heater 14b to an ON state (step P5). Thus, the catalyst in the catalyst mounting heater 14b reaches its activity temperature burning the contacting particulates and raising suddenly a temperature of the diesel exhaust gas. The downstream side is exposed to a hot diesel exhaust gas and a temperature of it rises, resulting in a burning and a removing of a large volume of unburned particulates captured in the catalyst mounting spherical filter 16b and others. As a result, it is possible to previously prohibit a back pressure from rising which lowers engine efficiency and causes damage to the exhaust system.

In the next step of step P6, the control portion keeps watching the temperature difference (Td–Tu) between the upstream and downstream sides in the apparatus main body 9b. As described above, the downstream side of the apparatus main body 9b having the catalyst mounting heater 14b in an ON state is exposed to a diesel exhaust gas hotter than that of the upstream side, so that the temperature difference (Tu–Td) develops with elapse of time. When the temperature difference (Tu–Td) detected and determined by the downstream side thermo-sensor Db and the upstream-side thermo-sensor Ub becomes over the previously set second standard value of 5° C., the control portion turns off the catalyst mounting heater 14b (step P7). Therefore, too much activity of the catalyst and thermal damage of the structural parts of the catalyst mounting heater 14b and others are prohibited from happening.

In the next step P8, the control portion watches a temperature difference (Tu–Td) between the upstream and the downstream sides in the apparatus main body 9c . At this time, the catalyst mounting heater 14c in the apparatus main body 9c is in an OFF state (step P1), so that the catalyst is kept at a temperature lower than its activity temperature. As a result, a large volume of unburned particulates flow to the downstream side and they contact with and are captured by a heat-resisting filter 15c, a catalyst mounting cylindrical heater 16c, and a metal fiber filter 18c respectively in this condition have a temperature lower than that burning the diesel particulates, so that the captured unburned particulates are not burned and removed. As a result, a clogged condition of the heat-resisting filter 15c and the catalyst mounting cylindrical filter 16c develops. Speaking of the thermal relationship, as described above, a temperature of the upstream side initially exposed to a hot diesel exhaust gas rises higher than the downstream, and the temperature difference (Tu–Td) advances with elapse of time. When a temperature difference (Tu–Td) detected and determined by an upstream-side thermo-sensor Uc and a downstream side thermo-sensor Dc becomes over the first standard value (step P8), the control portion judges that a clogged condition of the catalyst mounting spherical filter 16c and others at the downstream side is advancing and changes the OFF state of the catalyst mounting heater 14c to an ON state (step P9). Resultantly, a temperature of a catalyst in the catalyst mounting heater 14c reaches its active state, burning the contacted particulates and suddenly raising the temperature of a diesel exhaust gas. The downstream side is exposed to a hot diesel exhaust gas and its temperature rises, so that a large volume of unburned particulate collected in the catalyst mounting cylindrical filter 16c and others are burned and removed. It is possible to prevent before happening a rising of a back pressure which causes a reduction in engine efficiency and damage to the exhaust system.

In the next step P10, the control portion keeps watching a temperature difference (Td–Tu) between the upstream and the downstream in the apparatus main body 9c. Now, the downstream side in the apparatus main body 9c provided with the catalyst mounting heater 14c in an ON state is exposed to a diesel exhaust gas with a temperature higher than that of the upstream side, and the temperature difference (Td–Tu) increases with elapse of time. When a temperature difference (Td–Tu) detected and determined by the downstream side thermo-sensor Dc and the upstream-side thermo-sensor Uc advances over the second standard value of 5° C. previously set (step P10), the control portion turns the catalyst mounting heater 14c to an OFF state (step P1). As a result, the catalyst is not activated excessively and a thermal damage to structural parts of the catalyst mounting heater 14c and others is avoided.

Next, proceeding to step P12, the control portion again watches a temperature difference (Tu–Td) between the upstream and the downstream in the apparatus main body 9a. The catalyst mounting heater 14a in the apparatus main body 9a has been changed to an OFF state (step P3), the catalyst is cooled down to a temperature under the activity temperature. As a result, a large volume of unburned particulates flow to the downstream side, and are captured in the heat-resisting filter 15a and the catalyst mounting cylindrical filter 16a. However, in this situation, the heat-resisting filter 15a and the catalyst mounting cylindrical filter 16a have a temperature lower than a burning temperature of diesel particulates, therefore the captured unburned particulates are not burned and removed, resulting in an advancement of the clogged condition in the heat-resisting filter 15a and the catalyst mounting cylindrical filter 16a. Also, in this situation, as described above, the upstream side initially exposed to a thermal energy of a diesel exhaust gas is heated to a level higher than the downstream side and the temperature difference (Tu–Td) increases with elapse of time.

When a temperature difference (Tu–Td) detected and determined by the upstream-side thermo-sensor Ua and the downstream side thermo-sensor Da is over the first standard value (step P12), the control portion judges that a clogged condition is progressing in the catalyst mounting cylindrical filter 16a at the downstream side and changes an OFF state of the catalyst mounting heater 14a to an ON state (step P13). Thus, the catalyst in the catalyst mounting heater 14a reaches again its active temperature, burning the contacted particulates and consequently a temperature of a diesel exhaust gas suddenly rises. The downstream side is then exposed to a hot diesel exhaust gas, so that many unburned particulates captured in the catalyst mounting cylindrical filter 16a and others are burned and removed. As a result, it is possible to prevent a back pressure from rising which decreases an engine efficiency and causes damage to the exhaust system. After this, returning to step P2, various steps described above are repeated.

As described above, according to the third embodiment, a suitable catalyst is used and a sophisticated design is used on a surface hole shape of the catalyst mounting heaters 14a, 14b, and 14c, it is possible to raise a catching ratio of particulates. Because the catalyst and the heater are integrally structured, it is possible to attain a high-speed follow-up as far as a temperature of the catalyst is concerned, thus decreasing a load on the battery and a power to be used. That is, the catalyst is activated with a low electricity, so that it is possible to surely burn and remove the captured particulates for refreshing the filters. Also, the apparatus of the third embodiment has a three-vessel structure consisting of the catalyst mounting heaters 14a, 14b, and 14c, and these heaters are used in alternative fashion. As a result, a burden on one vessel is further decreased, thus improving considerably a durability of the apparatus.

It is apparent that the present invention is not limited to the above embodiments, but may be changed and modified without departing from the scope and spirit of the present invention. For example, the metallic heat generation body is contained in a cylindrical vessel as accurate as possible, provided that a lack of pressure does not matter as a back pressure applied to the engine. The shape of the heat generation body is not limited to a roll type (see FIG. 3). For example, a folding type can be used. Furthermore, in the embodiment above, a single metallic heat generation body is employed, but it is possible to use plural metallic heat generation bodies arranged in series or in parallel. The number of the apparatus main bodies is not limited to two or three. A four-vessel type and more, and a single vessel type may be used.

Figure 15:
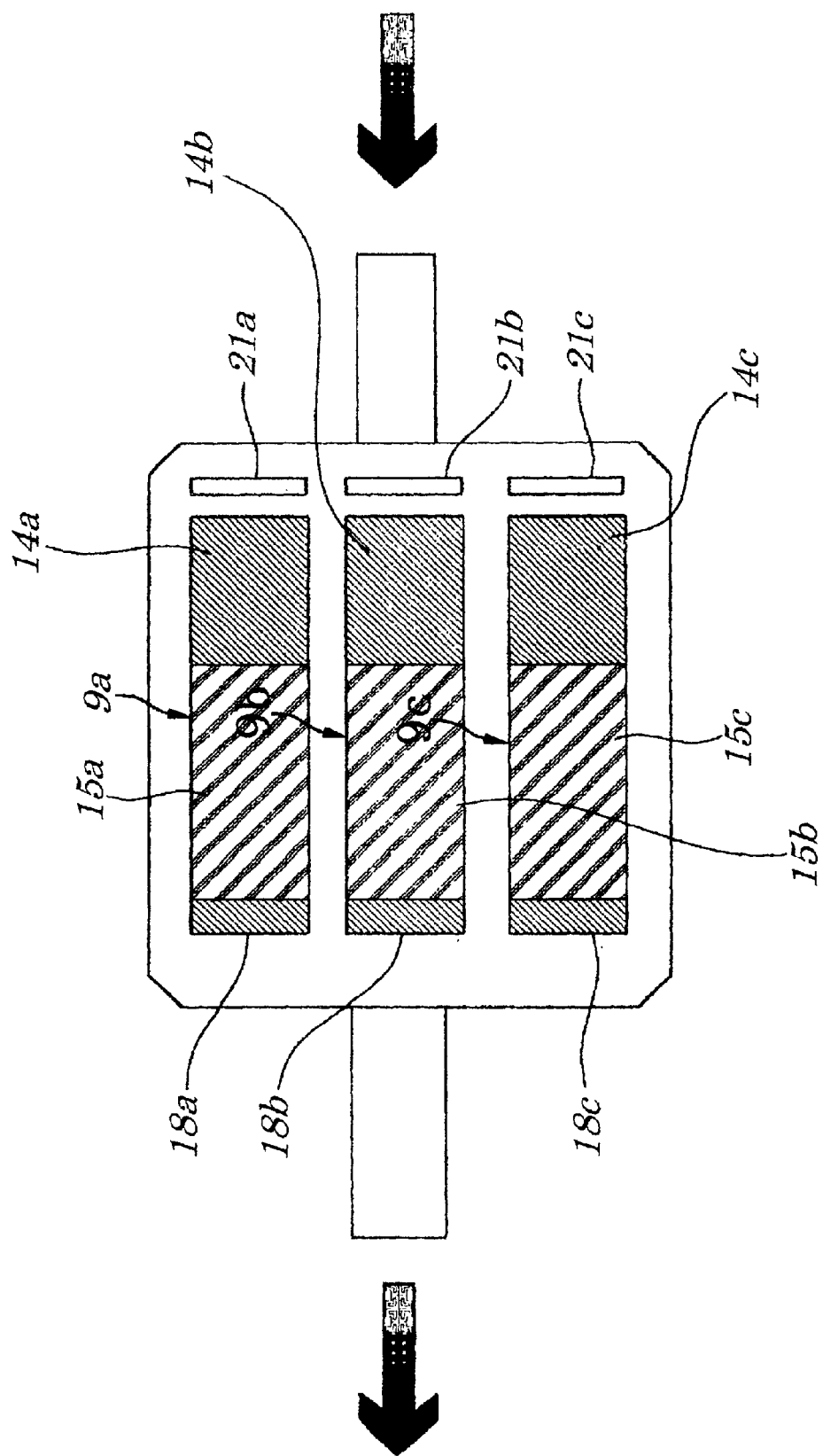
FIG. 15 is a view of the modification of the present invention.
Figure 16:
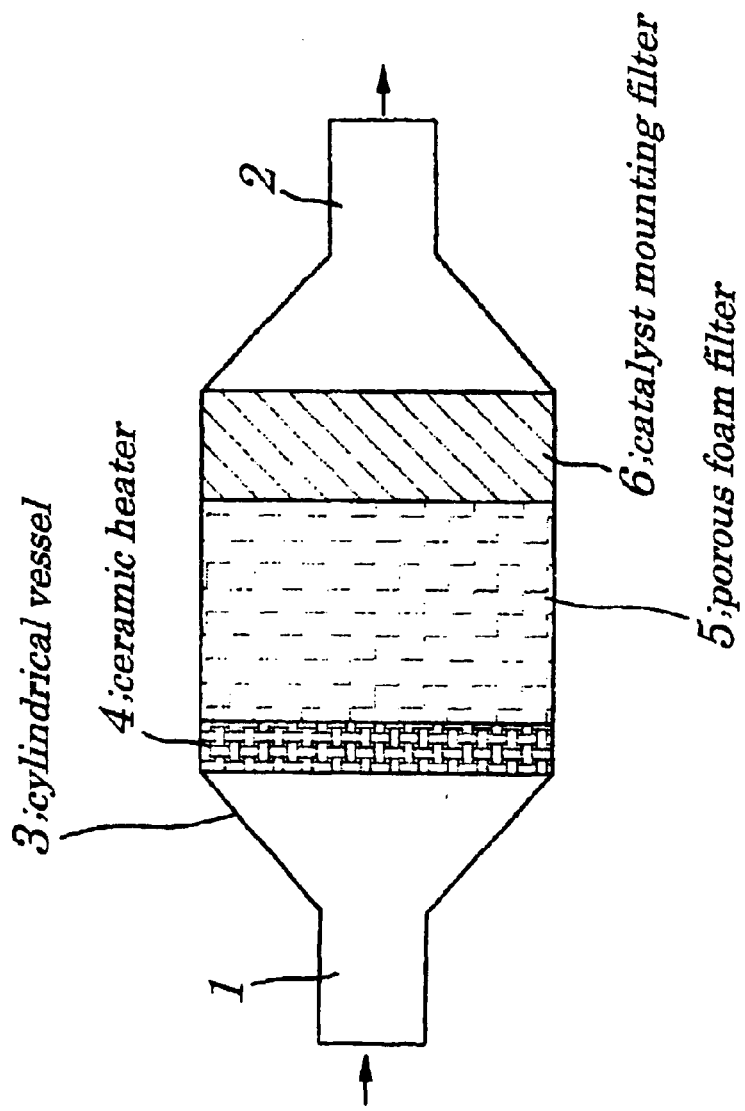
FIG. 16 is a view explaining a prior art invention.

According to the embodiments above, with respect to a battery capacity, two catalyst mounting heaters of a two-vessel type are alternatively turned on. In case of the three-vessel type, three catalyst mounting heaters are sequentially turned on one by one. When the battery has a sufficient power, it is possible to turn on simultaneously a plurality of vessels of the catalyst mounting heater. By providing change-over valves 21a, 21b, 21c at inlet ports of respective vessels as shown in FIG. 15 and the inlet ports are closed with the change-over valves, it is possible to solve at a greater level a problem of clogging in the vessels.

As described above, the diesel particulate removing apparatus of the present invention is able to raise to a greater level a catching ratio of particulates, as well as because that a catalyst and a heater are integrally structured, a temperature of the catalyst rises rapidly and the catalyst can be controlled with a high speed. Also, a burden on the battery can be decreased, so that needed electric power can be lowered. That is, a low electric power can make the catalysts active and consequently the captured particulates are able to burn and removed in a greater level of certainly refreshing the filters and lengthening considerably a life of the apparatus.

What is claimed is:

1. A diesel particulate removing apparatus comprising:
    a plurality of particulate removing apparatus main bodies arranged in parallel and said plurality of particulate removing apparatus main bodies comprising:
    a cylindrical vessel comprising an inlet port and an outlet port for a diesel exhaust gas;
    a metallic heat generation body of at least one of a roll-type and a folding-type arranged at said inlet port in said cylindrical vessel; and
    a heat-resisting filter arranged in a subsequent stage of said metallic heat generation body in order to capture, burn and eliminate particulates in said diesel exhaust gas,
    wherein said metallic heat generation body is covered with a catalyst accelerating a burning of said particulates,
    wherein said metallic heat generation body in said plurality of said particulate removing apparatus main bodies is structured so that an ON state/OFF state of said plurality of said particulate removing apparatus main bodies is selectively controlled, and
    wherein each of said plurality of particulate removing apparatus main bodies comprises an upstream-side thermo-sensor and a downstream side thermo-sensor, respectively placed near said inlet port and said outlet port, and wherein an ON state/OFF state of corresponding said metallic heat generation bodies is controlled on a basis of a temperature difference between an upstream-side temperature detected by said upstream-side thermo-sensor and a downstream-side temperature detected by said downstream-side thermo-sensor.

2. The diesel particulate removing apparatus according to claim 1, wherein said metallic heat generation body is structured by at least one of rolling a belt-like metal along its longitudinal axis in a whirlpool shape and folding said belt-like metal in a lamination, said belt-like metal having a number of through holes formed therein.

3. The diesel particulate removing apparatus according to claim 1, wherein said metallic heat generation body is structured by at least one of rolling a belt-like metal along its longitudinal axis in a whirlpool shape and folding said belt-like metal in a lamination, said belt-like metal having a longitudinal wave shape and a number of through holes formed therein.

4. The diesel particulate removing apparatus according to claim 1, wherein said metallic heat generation body is structured by at least one of rolling a belt-like metal along its longitudinal axis in a whirlpool shape and folding said belt-like metal in a lamination, said belt-like metal having an uneven surface, an uneven back face, and a number of through holes formed therein.

5. The diesel particulate removing apparatus according to claim 2, wherein said metallic heat generation body has a number of first through holes having one of a single first thorn and plural first thorns protruding outwardly from the surface of said belt-like metal and a number of second through holes having one of a single second thorn and plural second thorns protruding outwardly from the back face of said belt-like metal.

6. The diesel particulate removing apparatus according to claim 2, wherein said metallic heat generation body has a number of first through holes having one of a single first side wall and plural first side walls being arranged to protrude outwardly from the surface of said belt-like metal at one of a whole circumference of said first through holes and a part of the circumference of said first through holes, and a number of second through holes having one of a single second side wall and plural being arranged to protrude outwardly from the back face of said belt-like metal at one of the whole circumference of said second through holes and a part of the circumference of said second through holes.

7. The diesel particulate removing apparatus according to claim 1, wherein said catalyst comprises at least one of α-alumina, β-alumina, and γ-alumina.

8. The diesel particulate removing apparatus according to claim 7, wherein said catalyst comprises 68% to 78% of said at least one of α-alumina, β-alumina, and γ-alumina.

9. The diesel particulate removing apparatus according to claim 7, wherein said catalyst comprises:
at least one of α-alumina, β-alumina, and γ-alumina; and
at least one substance selected from a group of palladium, rhodium, ruthenium, titanium, nickel, iron, and cobalt.

10. The diesel particulate removing apparatus according to claim 7, wherein said catalyst comprises:
at least one of α-alumina, β-alumina, and γ-alumina;
ruthenium; and
at least one substance selected from a group of lithium girconate, titanium oxide, and potassium carbonate.

11. The diesel particulate removing apparatus according to claim 1, further comprising a hollow branched portion having one inlet port and a plurality of outlet ports for a diesel exhaust gas, a hollow junction portion having a plurality of inlet ports and one outlet port for a diesel exhaust gas, and a plurality of said particulate removing apparatus main bodies sandwiched between said outlet ports of said hollow branched portion and said inlet ports of said hollow junction portion so as to communicate with each other.

12. The diesel particulate removing apparatus according to claim 11, wherein said hollow branched portion comprises a collision plate within said hollow branched portion to assist speed reduction and dispersion of said diesel exhaust gas introduced from said inlet port of said cylindrical vessel.

13. The diesel particulate removing apparatus according to claim 11, wherein said outlet port of said hollow junction portion comprises an opening area larger than that of said inlet port of said hollow branched portion.

14. The diesel particulate removing apparatus according to claim 11, wherein said apparatus comprises one of two of said particulate removing apparatus main bodies and three of said particulate removing apparatus main bodies, said particulate removing apparatus main bodies comprising a same structure.

15. The diesel particulate removing apparatus according to claim 1, wherein said plurality of metallic heat generation bodies respectively installed one by one in said plurality of particulate removing apparatus main bodies is structured so that an ON state/OFF state of said metallic heat generation bodies is changed over on a basis of at least one of alternatively and sequentially at a predetermined time interval.

16. The diesel particulate removing apparatus according to claim 1, wherein when said upstream-side temperature is higher than said downstream-side temperature and a temperature difference between said upstream-side temperature and said downstream-side temperature is greater than a first standard value previously set, said metallic heat generation body is turned on, and when said downstream-side temperature is higher than said upstream-side temperature and a temperature difference between said downstream-side temperature and said upstream-side temperature is greater than a second standard value previously set, said metallic heat generation body is turned off in a sequential manner.

17. The diesel particulate removing apparatus according to claim 16, wherein said apparatus comprises a plurality of said particulate removing apparatus main bodies of the same structure with each other,
wherein when said metallic heat generation body of a first of said particulate removing apparatus main bodies is in an ON state, said downstream-side temperature associated with said first of said particulate removing apparatus main bodies becomes higher than said upstream-side temperature, and when a temperature difference between these two temperatures is over said second standard value previously set, said metallic heat generation body is turned off, then, when said upstream-side temperature associated with said second of said particulate removing apparatus main bodies becomes higher than said downstream-side temperature, and when a temperature difference between these two temperatures is over said first standard value previously set, said metallic heat generation body is turned on, and
wherein as a result of said turn ON state, when said downstream-side temperature associated with said second particulate removing apparatus main bodies becomes higher than said upstream-side temperature, and when a temperature difference between these two temperatures is over said second standard value previously set, said metallic heat generation body is turned off, and thereafter said ON/OFF operations are repeated in a sequential manner.

18. The diesel particulate removing apparatus according to claim 1, wherein said particulate removing apparatus main bodies comprise pressure sensors at predetermined positions, and an ON state of corresponding said metallic heat generation body is controlled on a basis of detection results of said pressure sensors.

19. The diesel particulate removing apparatus according to claim 1, wherein said inlet port of said particulate removing apparatus main bodies comprises a change-over valve installed thereon, and said change-over valve is controlled to be closed when said metallic heat generation body is in an OFF state.

20. The diesel particulate removing apparatus according to claim 5, wherein said first thorns and said second thorns are formed in an overhang shape extending outwardly from said through holes.

21. The diesel particulate removing apparatus according to claim 6, wherein said side walls associated with at least one of said through holes are structured to prevent said particulates from entering straight ahead into said metallic heat generation body through said inlet port of said cylindrical vessel.

* * * * *